United States Patent [19]
Furness et al.

[11] 3,904,559
[45] Sept. 9, 1975

[54] FOUNDRY AGGREGATE BINDERS
[75] Inventors: Ralph J. Furness, Tonawanda; Frank W. Less, Kenmore, both of N.Y.
[73] Assignee: Hooker Chemicals & Plastics Corporation, Niagara Falls, N.Y.
[22] Filed: Nov. 19, 1973
[21] Appl. No.: 416,895

Related U.S. Application Data
[63] Continuation-in-part of Ser. No. 236,230, March 20, 1972, abandoned.

[52] U.S. Cl. ............ 260/19 R; 164/43; 260/18 TN; 260/31.6; 260/33.6 UB; 260/38
[51] Int. Cl. ........................... B22c 1/22; C68g 5/20
[58] Field of Search. 260/19 R, 2.5 AW, 38, 260/18 TN, 30.4, 33.6, 31.6; 164/43, 164/316

[56] References Cited
UNITED STATES PATENTS

| | | | |
|---|---|---|---|
| 2,284,637 | 6/1942 | Catlin | 260/2 |
| 3,409,579 | 11/1968 | Robins | 260/30.4 |
| 3,428,110 | 2/1969 | Walker | 164/43 |
| 3,538,040 | 11/1970 | Grazen | 260/37 |
| 3,706,680 | 12/1972 | Booth | 260/2.5 AM |

FOREIGN PATENTS OR APPLICATIONS

| | | |
|---|---|---|
| 1,238,550 | 7/1971 | United Kingdom |
| 919,861 | 2/1963 | United Kingdom |

OTHER PUBLICATIONS
Martin "The Chemistry of Phenolic Resins," 1956, pp. 99 to 107.

*Primary Examiner*—Donald E. Czaja
*Assistant Examiner*—William E. Parker
*Attorney, Agent, or Firm*—Peter F. Casella; James F. Mudd

[57] ABSTRACT

A binder for foundry aggregates comprises a phenolic compound, an organic polyisocyanate, and a substantially non-aqueous, organic solvent soluble resin prepared by reacting (a) a condensation product of a phenol and an aldehyde or ketone containing condensate units having reactive phenolic hydroxyl groups, and (b) a substance reactive with the phenolic hydroxyl groups such as a mono oxirane ring compound, an alkylene halohydrin or an alkylene carbonate. Said phenolic compounds can be represented by the formula:

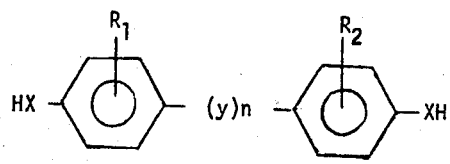

wherein X is oxygen or sulfur, y is an alkylidene radical, an arylene radical, an aryl bis alkylene radical, —S—, —S—S—, or

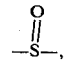

$n$ is 0 or 1, and $R_1$ and $R_2$ are hydrogen, alkyl of 1 to 6 carbon atoms or halogen. The binders are useful in preparing foundry aggregate compositions which can be cured at room temperature.

Shaped foundry products such as cores made using organic isocyanate, phenolic compound, resin binders are rendered easy releasing from metallic and thermosetting resin patterns by the incorporation of tall oil, fatty acid ester, or poly(ethylene glycol) esters of fatty acids into the binder composition.

27 Claims, No Drawings

FOUNDRY AGGREGATE BINDERS

This is a continuation-in-part of Ser. No. 236,230 filed Mar. 20, 1972, now abandoned.

BACKGROUND OF THE INVENTION

Foundry molds and cores used in making metal castings can be prepared from a mixture of an aggregate material which has been combined with a binding amount of a polymerizable or curable binder. The mixture is thereafter rammed, blown or otherwise introduced into a pattern and cured by the use of catalysts such as chlorine and carbon dioxide and/or the application of heat. The present invention provides a novel resin binder system that cures at low temperatures, or even at room temperature.

Accordingly, it is an object of the invention to provide a novel resin binder for foundry aggregates. It is also an object of the invention to provide novel resin binders for foundry aggregates that are capable of curing at low temperatures, even at room temperature. A further object is to provide a novel binder for cores and molds which have easy releasing properties. These and other objects will become apparent to one skilled in the art in the light of the following specification.

SUMMARY OF THE INVENTION

This invention relates to novel foundry aggregate binders. More particularly, the invention relates to binders for foundry aggregates which comprise a phenolic compound, an organic polyisocyanate, and a substantially non-aqueous, organic solvent soluble resin prepared by reacting (a) a condensation product of a phenol and an aldehyde or ketone containing condensate units having reactive phenolic hydroxyl groups, and (b) a substance reactive with the phenolic hydroxyl groups such as a mono oxirane ring compound, an alkylene halohydrin or an alkylene carbonate.

The invention utilizes a resinous composition which comprises

A component having the formula:

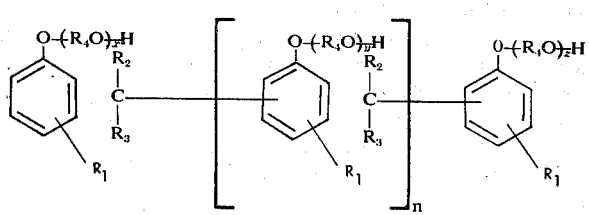

wherein
- $n$ has an average value of about 0.2 to 6, preferably about 0.5 to 3;
- $x$, $y$ and $z$ are integers from 1 to 25, preferably about 1 to 10;
- $R_1$ is independently selected from the group consisting of hydrogen, fluorine, chlorine, bromine, and a hydrocarbon radical;
- $R_2$ and $R_3$ are independently selected from the group consisting of hydrogen, a hydrocarbon radical, and a halogen substituted hydrocarbon radical; and
- $R_4$ is a hydrocarbon radical.

The phenolic compound utilized in the invention can be a compound such as bisphenols, biphenols, thiodiphenols, sulfonyl diphenols, mercaptodiphenols, triphenols. Said phenolic compound can be represented by the formula:

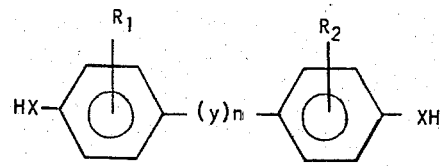

wherein X is oxygen or sulfur, y is an alkylidene radical, an arylene radical,

$n$ is 0 or 1, and $R_1$ and $R_2$ are hydrogen, alkyl of 1 to 6 carbon atoms, or halogen. The monomeric compound contains two or more active hydrogens capable of reacting with the organic polyisocyanate of the invention. Further in accordance with the invention, there is provided moldable compositions comprising foundry aggregate and the novel foundry aggegate binders. The invention also provides for foundry molds and cores comprised of foundry aggregate that is consolidated with the novel foundry aggegate binders.

DESCRIPTION OF THE PREFERRED EMBODIMENTS

The resin component defined hereinabove by formula can be prepared by the process which comprises reacting together:

a. a fusible, organic solvent soluble condensation product of a phenol and an aldehyde or ketone containing condensate units having reactive phenolic hydroxyl groups, and b. a substance reactive with the phenolic hydroxyl groups and selected from the group consisting of mono oxirane ring compounds, alkylene halohydrins, alkylene carbonates, and mixtures thereof. The condensation product can also be prepared by first reacting the phenol with the substance reactive with the phenolic hydroxyl group, and thereafter condensing the modified phenol with an aldehyde or ketone.

Fusible, organic solvent soluble condensation products of a phenol and an aldehyde or ketone suitable for use as starting materials in practicing the invention are well known to the art and can be prepared by well known methods. The phenol-aldehyde or phenol-ketone condensate should be soluble in organic solvents such as acetone and it should not be advanced to the insoluble C stage or resite stage. When the phenol is present itself and the aldehyde is formaldehyde, one type of condensation which is highly satisfactory contains condensation units which can be exemplified by the following formula:

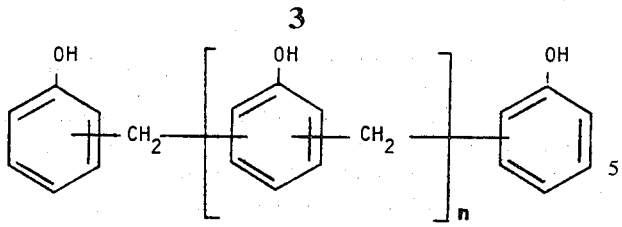

wherein $n$ has an average value of about 0.2 to 6, and often higher provided the resin is fusible and acetone or organic solvent-soluble. Preferably, the phenol-aldehyde condensate is a novolac, which contains more than one mole of phenol per mole of aldehyde or ketone.

Examples of phenols which can be used in preparing phenol-aldehyde condensates for use in practicing the invention include phenol itself or substituted phenols, wherein at least about half the substituted phenols have a least two of the ortho and para positions of the phenol nucleus available for condensation reaction (unsubstituted). Such phenols have the following general formula:

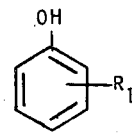

where $R_1$ can be H, F, Cl, Br or a suitable substituent selected from the following:

a. alkyl and alkenyl groups of one to eighteen carbon atoms in any of their isomeric forms and substituted on the phenolic nucleus in the ortho, meta or para positions;

b. alicyclic groups of five to eighteen carbon atoms such as cyclohexyl, cyclopentyl, methyl cyclohexyl, butylcyclohexyl, and the like;

c. aromatic or aralkyl groups of six to eighteen carbon atoms such as phenyl, alpha-methyl benzyl, benzyl, cumyl, and the like;

d. alkyl, alkenyl, alicyclic, aryl and aralkyl ketones wherein the hydrocarbon is defined hereinbefore;

e. alkyl, alkenyl, alicyclic, aryl and aralkyl carboxylic groups wherein the hydrocarbon is defined hereinbefore, and mixtures thereof. As indicated, the hydrocarbon radicals preferably have one to eighteen carbon atoms.

Suitable substituted phenols include the following: paratertiary-butylphenol, para-chlorophenol, paratertiary hexylphenol, paracyclohexylphenol, para-octadecylphenol, para-nonylphenol, parabeta-naphthyl-phenol, para-alpha-naphthyl-phenol, cetylphenol, paracumylphenol, para-hydroxy acetophenone, para-hydroxybenzophenone, a phenol alkylated with limonene, a phenol alkylated with oleic acid, as well as the corresponding ortho and meta derivatives such as meta-butyl phenol and ortho butyl phenol, as well as mixtures thereof.

Aldehydes or ketones or mixtures thereof capable of reacting with a phenol are satisfactory, provided the aldehydes or ketones do not contain a functional group or structure which is deterimental to the condensation reaction or with oxyalkylation of the condensate. The preferred aldehyde is formaldehyde, which can be in aqueous solution or in any of its low polymeric forms such as paraform or trioxane. The aldehydes preferably contain one to eight carbon atoms. Other examples include acetaldehyde, propionaldehyde, butyraldehyde, benzaldehyde, furfural, 2-ethylhexanol, ethylbutyraldehyde, heptaldehyde, pertaerythrose, glyoxal, chloral, and the like. The ketones have the formula:

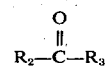

wherein $R_2$ and $R_3$ can be hydrogen or organic radicals. Examples of ketones are acetone, methyl ethyl ketone, diethyl ketone, methyl benzyl ketone, methyl cyclohexyl ketone, diallyl ketone, dichloromethyl ketone, as well as mixtures thereof. $R_2$ and $R_3$ preferably have 1 to 7 carbon atoms.

The ratio of aldehyde or ketone to the phenol (or oxyalkylated phenol) can be varied to prepare condensates of various molecular weight and viscosity of the final condensation product can be regulated by the molecular weight of the phenol-aldehyde or phenol-ketone condensate. Preferably, the amount of aldehyde or ketone varies from 0.5 to 1.0 mole per mole of the phenol (or oxyalkylated phenol) when a mono- or di-functional phenol is used. In instances where a trifunctional phenol is used, the preferred upper aratio of aldehyde or ketones is about 0.85 mole per mole of phenol (or oxyalkylated phenol). It is preferred that the aldehyde or ketone and phenol be reacted using an acid catalyst such as sulfuric, hydrochloric or oxalic acid, but basic catalysts also can be used. In some instances, catalysts are not necessary. Examples of alkaline catalysts include ammonia, amines and quaternary ammonium bases. Wetting agents of the anionic type such as sodium alkyl aryl sulfonate, can be used to speed up the reaction when weak acids are used.

In instances where a resole is prepared, more than one mole of formaldehyde per mole of phenol (or oxyalkylated phenol) is useful. The specific phenols and aldehydes or ketones which can be used are described above, and the alkaline catalysts described above also are useful. The resoles have carbinol groups, as well as phenolic hydroxyl groups, which can be reacted with the reagents to be discussed hereinafter.

In accordance with the present invention, improved condensation products can be prepared which preferably contain substantially no free reactive phenolic groups, i.e., less than about 5 percent, but preferably less than about 0.5 percent of the phenolic hydroxyl present originally in the phenol-aldehyde or phenol-ketone condensate.

Preferrred method of hydroxyalkylation is by reaction with compounds containing a mono oxirane ring. Monomeric epoxides having two to eighteen carbon atoms are preferred. Examples of mono-epoxides that can be employed are ethylene oxide, propylene oxide, butylene oxide, cyclohexane oxide, 2,3-epoxyhexane, epichlorohydrin, styrene oxide, allyl glycidyl ether, methyl glycidyl ether, butyl glycidyl sulfide, glycidyl methyl sulfone, glycidyl methacrylate, glycidyl allpha phthalate, and the like. The preferred mono-epoxides are the mono-epoxide substituted hydrocarbons, the mono-epoxy-substituted ethers, sulfides, sulfones and esters wherein the said compounds contain two to eighteen carbon atoms. Minor amounts of di-epoxides can also be incorporated into the compositions. Typical di-epoxides are 3,4-epoxy-6-methylcyclohexylmethyl-3,4-epoxy-6methylcyclohexanecarboxylate, dicyclopentadiene dioxide, limonene dioxide, 4,4′(diglycidyl) diphenylpropane, vinylcyclohexane dioxide. Many other epoxides can be used, but the alkylene oxides containing two to six carbon atoms are generally used. Mixtures of the foregoing compounds are very useful.

Catalysts for the reaction of the oxirane ring compounds and phenolic hydroxyl groups are alkali or alkaline earth hydroxides, primary amines, secondary amines, tertiary amines, or basic alkali salts. These include sodium, potassium, lithium, calcium and barium hydroxides, amines such as methyl, dimethyl diethyl, trimethyl, triethyl, tripropyl, dimethyl benzyl, dimethyl hydroxyethyl, dimethyl-2-hydroxypropyl and the like, and salts of strong bases and weak acids such as sodium acetate or benzoate. Combinations of catalysts can be used to excellent advantage in obtaining particular products. For example an amine catalyst, such as triethyl amine can be used to add a mole or propylene oxide to each phenolic hydroxyl groups, and thereafter hydroxyalkylation can be continued with ethylene oxide using as catalyst an alkali metal hydroxyide, such as sodium hydroxide. In general, the hydroxyalkylation reaction can be carried out at 50° to 250° centigrade. The hydroxyalkylation of the phenols is preferably performed at 50° to 150°; the hydroxyalkylation of the phenolic condensates proceeds at better rates at 150° to 250°. Solvents are not normally preferred, although solvents can be used for the higher molecular weight resins to reduce viscosity.

The phenolic hydroxyl of the phenols or the phenolic condensates can also be hydroxyalkylated by reacting alkylene halohydrins with the phenolic hydroxyl using equivalent amounts of an alkali metal hydroxide to bring about the reaction. Suitable alkylene halohydrins are ethylene chloro- or bromohydrins, propylene chloro- or bromohydrins, 2,3-butylene chloro- or bromohydrins, glyceryl chloro- or bromohydrins.

Another method for hydroxylakylating novolacs is by reaction with alkylene carbonates such as ethylene carbonate and propylene carbonate, using a catalyst such as sodium or potassium carbonate.

In the preparation of the phenol-aldehyde or phenol-ketone condensation product, there should be at least one hydroxy-alkyl group per phenol-aldehyde or phenol-ketone molecule. It is preferred that there be at least about one mole of hydroxyalkylation agent per mole of phenolic hydroxyl. However, products prepared by reaction with a number of units of hydroxyalkylation agent per mole of phenolic hydroxyl are often desired, since the physical properties of polyurethane compositions containing them can be adjusted by controlling the ether chain length. Also the hydroxyl number of the modified phenol-aldehyde condensate can be adjusted by controlling the ether chain length. The length of the ether chain also influences the viscosity of the condensation product, as well as the physical properties of the moldable sand compositions ultimately prepared reacting the resin component with an organic polyisocyanate. Generally, it is not desired to react more than 10 moles of the hydroxyalkylation agent per mole of phenolic hydroxyl group. However, up to 25 units of hydroxyalkylation agent per mole of phenolic hydroxyl group can be employed if desired.

The phenolic compounds of the invention referred to as "bisphenols" are comprised of dihydric diphenols with a single carbon between the rings. These are available from any aldehyde and from many ketones reacted with any phenol having an open ortho- or para- position. The bisphenols herein referred to have the general formula:

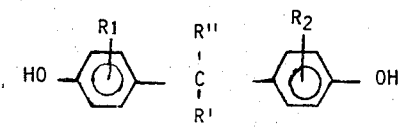

wherein R′ and R″ are hydrogen, alkyl of 1 to 6 carbon atoms, cycloalkyl of 5 to 6 carbon atoms, and haloalkyl of 1 to 6 carbon atoms, and can be the same or different. $R_1$ and $R_2$ are hydrogen, alkyl of 1 to 6 carbon atoms, or halogen. Representative bisphenol isomers are the o,o′-bisphenol, m,m′-bisphenol, p,p′-bisphenol, m,p-bisphenol, o,p-bisphenol, and o,m-bisphenol. Representative biscresols are 4,4′-bis-o-cresol, 6,6′-bis-o-cresol and 4,4′-bis-m-cresol. They are commonly prepared by reacting a phenol, for instance, phenol, ortho-cresol, meta-cresol, ortho-isopropylphenol, ortho-tertiary butylphenol, ortho-chlorophenol, various thio-substituted phenols, etc., with a ketone, such as acetone, methyl ethyl ketone, dibenzyl ketone, diethyl ketone, dibutyl ketone, cyclohexanone, etc., in the presence of a strong mineral acid, such as sulfuric or hydrochloric acid. The reaction may be carried out at room temperature but is usually conducted at temperatures from 30° to 90° centigrade. As the reaction progresses, the bisphenol product solidifies. After completion of the reaction, the mixture is a thick slurry or mass comprising the bisphenol product, uncondensed phenol, and the mineral acid employed to promote the reaction. Alternately, an aldehyde can be used instead of a ketone to form the bisphenols of the invention. In addition to formaldehyde, acetaldehyde, butyraldehyde, benzaldehyde, furfuryl, etc., can be used. Acetylene, which in many of its reactions, behaves as if it were the anhydride of acetaldehyde, can also be used in place of an aldehyde or ketone to obtain a bisphenol suitable for use as a phenolic compound of the invention. The reaction for the formation of a bisphenol from an aldehyde can be carried out in a known manner and a detailed description of this reaction is unnecessary. However, it may be mentioned that a strong mineral acid in high F, such as sulfuric acid or hydrochloric acid, preferably the latter, is used to promote the condensation, and that the yield of the bisphenol is highest when the phenolic reactant is employed in a proportion exceeding that theoretically required.

Representative bisphenols that can be utilized in the invention are bisphenols A, F. C and H. Bisphenol C and H are shown structurally as follows:

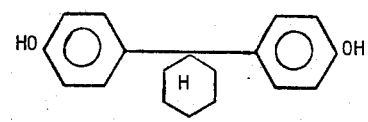

Bisphenol C

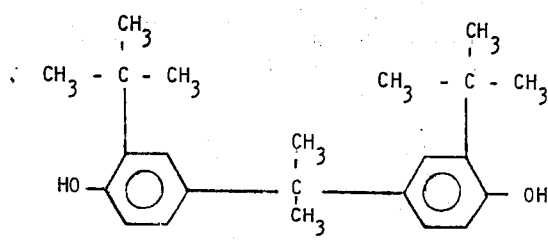

Bisphenol H

By the appropriate selection of halogenated phenol, halogenated bisphenol-A homologs can be obtained. Thus, by the reaction of acetone and ortho-chlorophenol, the dichloro-bisphenol-A compound may be obtained. By the reaction of ortho,ortho-dibromophenol with acetone, the 4,4'-isopropylidene-bis(2,6-dibromophenol) compound can be obtained. A suitable bisphenol-A ester can be obtained by the reaction of bisphenol-A and salicylic acid which is 4,4'-isopropylidene diphenol disalicylate.

Other bisphenols useful in the invention are: 2,2-bis(4-hydroxyphenyl)1,1,3,3-tetrafluoro-1,3-dichloropropane, 2,2-bis(4-hydroxyphenyl) 1,1,1,3,3-pentafluoro-3-chloropropane and their derivatives. This may be represented by the following formula:

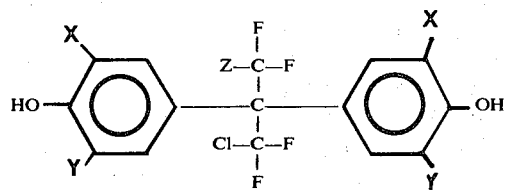

wherein Z is chlorine or fluorine and X and Y are hydrogen, chlorine or bromine, or alkyl radicals of 1 to 4 carbon atoms.

2,2-bis(4-hydroxyphenyl)1,1,3,3-tetrafluoro-1,3-dichloropropane and its derivatives may be represented by the general formula:

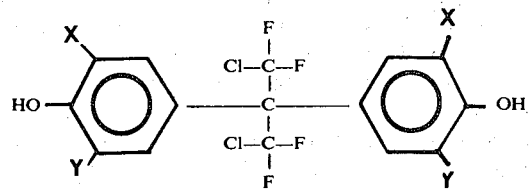

2,2-bis(4-hydroxyphenyl)1,1,1,3,3-pentafluoro-3-chloropropane and its derivatives may be represented by the general formula:

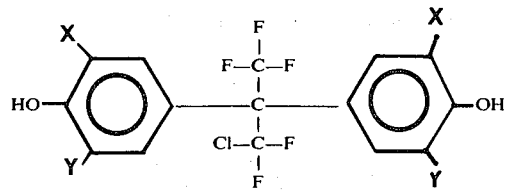

The halogenated bisphenols of the invention are readily prepared by reacting 1,1,3,3-tetrafluoro-1,3-dichloroacetone or 1,1,1,3,3-pentafluoro-3-chloroacetone with a phenolic compound of the formula:

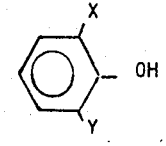

X and Y being as defined above, in a molar ratio of at least about 1.5 mols of phenolic compound per mol of ketone reactants, in the presence of boron trifluoride as catalyst.

1,1,3,3-tetrafluoro-1,3-dichloroacetone is a colorless liquid having a freezing point below −100°C. and a boiling point of 45.2°C. 1,1,1,3,3-pentafluoro-3-chloroacetone is a colorless gas having a boiling point of 7.8°C.

As the phenolic reactants there may be used phenol itself or its alkylated, brominated or chlorinated derivatives, in which any such substituents are adjacent to the hydroxyl group.

The phenolic compound referred to as a "biphenol" can have the general formula:

wherein R is an aryl group. Representative biphenols are o,o'-biphenol, m,m'-biphenol, p,p'-biphenol; bicresols, such as 4,4'-bi-o-cresol, 6,6'-bi-o-cresol, 4,4'-m-cresol; dibenzyl biphenols such as a,a'-diphenol-4,4'-bi-o-cresol; diethyl biphenols such as 2,2'-diethyl-p,p'-biphenol, and 5,5'-diethyl-o,o'-biphenol; dipropyl biphenols such as 5,5'-dipropyl-o,o'-biphenol and 2,2'-diisopropyl-p,p'-biphenol; diallyl biphenols such as 2,2'-diallyl-p,p'-biphenol; and dihalobiphenols, such as 4,4'-dibromo-o,o'-biphenol.

With regard to the dibenzyl biphenols, the positions of the phenolic hydroxyl groups and the benzyl radicals may be varied to obtain other useful compounds corresponding, e.g. to the bicresols listed above with various positions of the substituents. In addition, the aryl radicals in a diallyl biphenol compound may be replaced by other groups such as the 1-methyl allyl, 2-methylallyl, and 2-chloroallyl groups, to obtain generally equivalent properties. In addition to the dibromobiphenol shown as illustrating the dihalobiphenols, it is apparent that other halo radicals such as the chloro- radical may replace the bromo radical, and that, again, the positions of the substituents on the biphenol structure may be varied as with the bicresols. In addition, the biphenol may have more than one phenolic hydroxyl radical on each benzene ring. The two phenolic rings may be separated in the molecular structure with an arylene group, for example, a phenylene group interposed between them. Such a compound is illustrated by p-terephenol-4,4''-diol.

The phenolic compounds of the invention referred to as "thiodiphenols" can be illustrated by the following examples: 4,4'-thiodiphenol, 2,2'-thiodiphenol, 2,2'-thiobis(4-chlorophenol), and 4,4'-thiobis(6-tertbutyl-m-cresol).

The phenolic compounds referred to as "sulfonyl diphenols" can be illustrated by the compounds 4,4'-sulfonyl diphenol and 2,4'-sulfonyl diphenol.

It is apparent that the sulfur in the thiodiphenols can be substituted with additional sulfur without affecting the reactivity of the compounds in the process of the invention.

The mercapto phenols of the invention are the corresponding compounds obtained by reacting mercaptophenol rather than phenol itself with the corresponding aldehydes and ketones as illustrated in the preparation of the bisphenols hereinabove. Representative mercaptophenols include the ortho- and para- non-alkyl substituted mercaptophenols, as well as other mercaptophenols having an alkyl, alkylaryl, or arylalkyl substituent in which the substituent is at the ortho- or the para- position. There can be up to four such substituents on the mercaptophenol molecule. Examples of alkyl groups are methyl, ethyl, butyl, decyl, octadecyl; examples of alkylaryl and arylalkyl groups are cresyl, xylyl, tetramethylphenyl, decylphenyl, dodecylphenyl, and the like. Examples of typical compounds include phenyl mercaptophenols, mercaptonaphthols, and mercaptocresols, 2-mercapto-6-octadecylphenol, 4-mercaptophenol, 2-mercapto-4-chlorophenol, 2-mercapto-4,6-di-tert-butylphenyl, and o-mercaptophenol. It should also be noted that polyhydric mercaptophenols as well as mixtures of various mercaptophenols can be used. These compounds are similarly useful as compared to the bisphenols in providing an active hydrogen for reaction with the organic polyisocyanate of the invention.

The two phenolic rings can be separated in the molecular structure with an aryl bis alkylene radical interposed between them. Such a compound useful in the process of the invention can be obtained by reacting phenol with divinyl benzene to produce a three-ring structure corresponding to the structural formula hereinbelow. It is apparent that other phenols may be used as described hereinabove in combination with divinyl benzene to produce other triphenols.

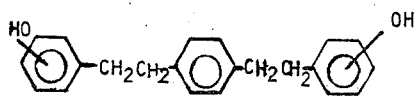

Suitable solvents or diluents for the phenolic compounds of the invention include the aliphatic ketones of 3 to 8 carbon atoms, such as acetone, methyl ethyl ketone, methyl n-propyl ketone, diethyl ketone, hexanone, cyclohexanone, etc., the monoester-monoethers of alkylene glycols of 2 to 10 carbons atoms, such as ethylene glycol (Carbitol), diethylene glycol (Cellosolve), propylene glycol, butylene glycol, and the like. Typical members of the foregoing class include Cellosolve acetete, methyl Cellosolve acetate, butyl Cellosolve acetate, Carbitol acetate, butyl Carbitol acetate, and mixtures thereof. Mixtures of the foregoing classes of solvents or diluents can also be employed. Auxiliary solvents can also be admixed with the foregoing classes of solvents or diluents, e.g., aromatic hydrocarbons of 6 to 10 carbon atoms, such as benzene, toluene, xylene, ethyl benzene, diethyl benzene, monochlorobenzene, and the like, aliphatic hydrocarbons, such as hexane, octane, mineral spirits, petroleum naphtha, and the like. The phenolic compound, resinous component and solvent are mixed until a uniform homogeneous mixture is formed. The solvent is generally employed in a ratio of about 30 to about 90 parts by weight per 100 parts of total mixed solids of said phenolic compound and resinous component, preferably in a range from about 40 to about 80 parts by weight of solvent per 100 parts of total mixed solids of said phenolic compound and resinous component.

Various organic polyisocyantes can be used in preparing the compositions of the invention. Among these isocyanates are 2,4-toluene diisocyanate, 2,6-toluene diisocyanate, and mixtures thereof, and particularly the crude mixtures that are commerically available. Other typical polyisocyanates include methylene bis(4-phenyl)isocyanate, n-hexyl diisocyanate, 1,5-naphthalene diisocyanate, 1,3-cyclopentylene diisocyanate, p-phenylene diisocyanate, 2,4,6-toluene triisocyanate, 4,4',4''-triphenylmethyl triisocyanate. Also contemplated are the many impure or crude polyisocyanates that are commercially available. Especially preferred for use in the invention are the polyaryl polyisocyanates having the following generalized formula:

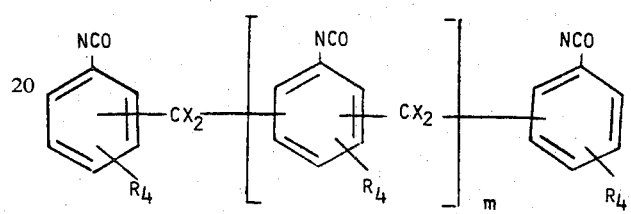

wherein $R_4$ is selected from the group consisting of hydrogen, chlorine, bromine, alkyl having 1 to 5 carbon atoms, and alkoxy having 1 to 5 carbon atoms; X is selected from the group consisting of hydrogen, alkyl having 1 to 10 carbon atoms, and phenyl; and m has an average value of at least about 0.5, generally about 0.5 to 1.6, preferably 0.6 to about 1.3. A preferred example is polymethylene polyphenylpolyisocyanate having an average functionality of 3. The organic polyisocyanate is preferably employed in a solution of the solvents hereinbefore described, generally in a ratio of about 15 to about 50 parts by weight of solvent per 100 parts of solids of the organic polyisocyanate, preferably about 25 to about 40 parts by weight of solvent per 100 parts of the organic polyisocyanate.

A small amount of an auxiliary compound reactive with isocyanato groups can, if desired, be blended with the resinous condensation product. Exemplary compounds include hydroxyl terminated polyesters, i.e., the product of a glycol such as ethylene or propylene glycol, or a polyol such as glycerol, with an acid such as phthalic, adipic, succinic, and the like; polyethers such as polyethylene glycol, polypropylene glycol, and the like; phenol-formaldehyde resins; alkyds; alkanol amines such as ethanolamine, triethanolamine, n-butylethanolamine, 2-amino-2-methyl-1-propanol, and the like. The auxiliary compounds can comprise up to about 2 weight percent based on the weight of the total composition. Also, if desired, a conventional hydroxyl-isocyanate catalyst such as dibutyltin dilaurate, dibutyltin diacetate, zinc naphthanate, lead naphthanate, and the like, can be present in the resinous composition to the extent of about 0.1 to about 5 weight percent based on the total weight of the binder composition, preferably about 3 to about 5 weight percent.

In the preparation of the moldable compositions of the invention, foundry aggregate is placed in a conventional muller or other suitable mixer. The aggregate of discrete inert solid particles is normally sand and frequently contains minor amounts of other materials such as iron oxide, cereal, and the like. A binder component consisting of a solution of the (1) resinous condensation product, and (2) a phenolic compound is introduced to the aggregate in a proportion sufficient to provide about 0.4 to 5 weight percent of said binder component based on the weight of the foundry aggregate, preferably in the range of about 0.6 to 2.5 weight percent and is mixed for 1 to 10 minutes, preferably about 1 to about 3 minutes. The aggregate grains are thereby coated with the sand binder component. Thereafter, a polyisocyanate component consisting of a polyisocyanate or solution thereof is introduced to the mixture of aggregate, solvent, and said binder component and mixing is continued for about 1 to 5 minutes, preferably about 2 to 3 minutes. The organic polyisocyanate component is employed in a proportion sufficient to provide about 0.4 to about 5 weight percent of polyisocyanate component based on the weight of the foundry aggregate, preferably in the range of about 0.5 to 2.5 weight percent. The proportion of total binder components plus polyisocyanate component is in the range of about 0.8 to 10 weight percent based on the weight of foundry aggregate, preferably about 1 to 5 weight percent. The proportion of the resinous condensation product to phenolic compound in said binder component can be from 30 to 100 percent, with a proportion of about 30 to about 60 percent preferred in the mixed compositions. A portion of the solvent generally evaporates in the muller. The said binder component and polyisocyanate are employed in a ratio sufficient to provide about 0.9 to about 1.1 isocyanato groups per hydroxyl group, preferably about 1 isocyanato group per hydroxyl group. The resulting moldable composition is then discharged from the mixer and introduced into a suitable mold of the desired shape.

The moldable composition can also be prepared by employing an apparatus known as a "slinger" which comprises two screw conveyors which converge at a common point into a single screw conveyor. Herein, a portion of the foundry aggregate and the resin are introduced into one of the two feed screw conveyors. The polyisocyanate and the remainder of the foundry aggregate is introduced into the second of the feed screw conveyors. The two screw conveyors discharge the sand coated with the respcetive components into the common screw conveyor where all of the reacting components are intimately mixed with the total charge of foundry aggregate.

The moldable composition is introduced into a suitable mold and cured at room temperature by employing a tertiary amine as a catalyst. Although it is especially preferred to employ a gaseous tertiary amine, volatilized tertiary amines in an inert gas stream such as nitrogen, carbon dioxide or air can be employed. Suitable tertiary amines, which generally contain up to 20 carbon atoms, include trimethylamine, triethylamine, tributylamine, tripropylamine, dimethyl-sec-butylamine, N,N-dimethylaniline, N-methyl-N-ethylaniline, p-nitroso-N,N-dimethylaniline, N-methyl morpholine, N-ethyl morpholine, tetramethylguanidine, N,N,N',N'-tetramethyl-1,3-butanediamine, triethylenediamine, and the like. The preferred gaseous tertiary amine is triethylamine. Gassing can be effected by placing manifolds across the top and bottom of the core to form a tight seal and then passing the gaseous amine or volatilized amine in an inert gas stream through the core.

The moldable compositions of the invention can be cured at room temperature or, if desired, at higher or lower curing temperatures, i.e., from about 10° to about 100° centigrade or higher, to form a polyurethane reaction product of the hydroxyl containing components of the binder component and the polyisocyanate. The cured foundry aggregate compositions generally contain about 0.3 to about 7 weight percent of total polyurethane binder composition (dry basis) based on the weight of foundry aggregate, preferably about 0.4 to about 5 weight percent. The compositions exhibit superior properties, such as faster cure, flexural strength, flowability of the binder aggregate composition, excellent release from the mold, retention of strength at elevated temperatures (e.g., 150°–300°F), compared to conventional volatile amine room temperature cured foundry molds and cores.

Easy releasing binders for cores and molds include as a component a fatty acid ester, tall oil, a poly(ethylene glycol) ester of a fatty acid or mixtures thereof. The use of poly(ethylene glycol) esters of fatty acids and/or fatty acid esters actually provide increases in tensile strength while improving mold release properties. Blends of tall oil and fatty acid esters or poly(ethylene glycol) esters of fatty acids are particularly desirable due to the improved release and high tensile strength of cores and/or molds in comparison with the unmodified binder systems of the invention.

The tall oil and/or fatty acid ester can be advantageously incorporated into either the resinous and phenolic compound mixture or the organic polyisocyanate component to provide a stable mixture. The poly(ethyelene glycol) esters of fatty acids can be incorporated into the resinous component, phenolic compound mixture.

Examples of suitable fatty acids for use in preparing the lower($C_1$ to $C_8$) alcohol and poly(ethylene glycol) derivatives useful in this invention are stearic, isostearic, lauric, oleic, palmitic, myristic, pelargonic, isodecanoic, arachidic, behenic, palmitoleic, ricinoleic, petroselinic, vaccenic, linoleic, linolenic, eleostearic, licanic, parinaric, godeleic, arachidonic, cetoleic, erucic, capric, caprylic, caproic, isovaleric, butyric, dodecylenic, stillingic, decylenic, and the like, including mixtures thereof. Typical useful lower alochols are methyl alcohol, butyl alcohol and propyl alcohol. Typical esters are the methyl and butyl stearic acid esters.

The amount of easy releasing binder component or mixtures of components is an effective amount of up to 10 percent by weight based upon either or both the resin-phenolic compound solution or upon the organic polyisocyanate solution. Thus, a maximum of up to 20 percent by weight on the total binder solution can be used. Preferably, the amount of easy releasing binder component is in the range of about 5 percent to about 8 percent by weight based upon either or both resin-phenolic component solution or organic polyisocyanate solution.

The following examples illustrate the various aspects of the invention but are not intended to limit it. Where not otherwise specified throughout this specification and claims, temperatures are given in degrees centigrade and parts are by weight.

EXAMPLE 1

A typical modified phenol-aldehyde condensation product was prepared by introducing 3,000 parts phenol, 13 parts of oxalic acid catalyst and 6 parts of a wetting agent into a jacketed reactor and heating to 100° centigrade. The anionic wetting agents of alkyl aryl sulfonate type are preferred. 1,110 parts of a 37 percent aqueous formaldehyde solution are added to the reactor at such a rate that the heat of reaction provide a vigorous reflux. Refluxing is continued for 2 hours after the completion of the formalin addition. The reactor content are dehydrated at 180° centigrade and then dephenolated at 200° centigrade at 50 millimeters vacuum. Approximately 2,030 parts of phenol-aldehyde condensate are produced. 7.2 parts of sodium hydroxide are introduced to the reactor. Ethylene oxide is then added to the reactor as either a vapor or a liquid. The reactor temperature is maintained at 190° centigrade for the initial two hours and is then permitted to increase to the range of 200 to 220 degrees centigrade until the addition of 878 parts of ethylene oxide is complete. The resulting condensation product has a hydroxyl number of 370, and a Gardner viscosity at 50° centigrade of about 2,000 seconds.

EXAMPLE 2

A typical modified phenol-ketone condensation product is prepared in a manner similar to the method of Example 1 by reacting 3,000 parts phenol, 820 parts acetone under refluxing conditions for 4 hours in the presence of 10 parts of sulfuric acid catalyst and 10 parts of alkyl benzene sulfonate wetting agent. After dehydration and dephenolation in the manner of Example 1, 10 parts of sodium hydroxide are introduced to the phenol-acetone condensate. Then 900 parts of ethylene oxide are introduced to the reaction mixture which is maintained at 180° to 220° centigrade. The resulting condensation product has a hydroxyl number of 310.

The characteristics of the compositions of Examples 1 and 2 can be drastically changed by varying the ratio of ethylene oxide to phenolic hydroxyl groups, and also by varying the ratio of phenol to aldehyde or ketone in the base condensate. In Examples 3 through 6, the ratio of ethylene oxide to phenolic hydroxyl group was varied from 1.50 to 3.00, while maintaining a ratio of phenol to aldehyde in the base condensate of 3 to 2. In Examples 7 through 9, the phenol to aldehyde ratio was changed to five to four and the ethylene oxide ratio was varied from 1.25 to 1.72. The effects on viscosity, as well as hydroxyl number, of the resulting addition products are shown in Table 1. All other conditions in Examples 3 to 9 are the same as those in Example 1.

TABLE I

| Example Number: | Ratio of phenol to aldehyde in base condensate | Ratio of ethylene oxide to hydroxyl group | Hydroxyl number | Viscosity |
|---|---|---|---|---|
| 1 | 3/2 | 1.0 | 376 | 2,000 |
| 3 | 3/2 | 1.50 | 339 | 335 |
| 4 | 3/2 | 2.0 | 301 | 52 |
| 5 | 3/2 | 2.5 | 267 | 23 |
| 6 | 3/2 | 3.0 | 250 | 13.7 |
| 7 | 5/4 | 1.25 | 340 | 19,500 |
| 8 | 5/4 | 1.50 | 320 | 2,200 |
| 9 | 5/4 | 1.72 | 292 | 545 |

The viscosities and hydroxyl numbers of the condensation products can also be varied by changing the type of alkylene oxide employed while holding both the chain length of the base condensate, as well as of the length of the alkylene oxide side chains constant. In Examples 10, 11 and 12, the method of preparation of Example 5 is repeated except that a portion or all of the ethylene oxide is replaced with propylene oxide. The hydroxyl numbers and viscosities of the resulting addition products are shown in Table II where these values are compared with those obtained in Example 5. Also shown in Table II are the properties of resin prepared as in previous examples, but with different ratios of phenol, formaldehyde and alkylene oxides.

The following examples illustrate the preparation of additional modified phenol-aldehyde compositions in accordance with this invention.

TABLE II

| Ex. No.: | Ratio of phenol to aldehyde in base condensate | Ratio of alkylene oxide to hydroxyl group | Hydroxyl number | Viscosity |
|---|---|---|---|---|
| 5 | 3/2 | 2.5 ethylene oxide | 267 | 23 |
| 10 | 3/2 | 2.0 ethylene oxide plus 0.5 propylene oxide | 256 | 21 |
| 11 | 3/2 | 1.73 ethylene oxide plus 0.76 propylene oxide | 257 | 19 |
| 12 | 3/2 | 2.5 propylene oxide | 244 | 31 |
| 13 | 4/3 | 3.5 ethylene oxide plus 3.5 propylene oxide | 200 | (1) |

$^1$2,500 centipoises at 30 degrees centigrade.

EXAMPLE 14

21 parts of an oxyalkylated novolac containing 3 phenyl nuclei per 2 methylene radicals and having 2.5 ethylene oxide units reacted per phenolic hydroxyl group, as prepared in Example 5 were mixed with 20 parts of xylene, 20 parts of Cellosolve acetate, 5 parts of furfuryl alcohol, and 5 parts of methyl isobutyl ketone and charged to a flask with reflux condenser and heated with agitation to 70° to 80° centigrade. 29 parts by weight of Bisphenol A were then added slowly and mixing continued until the Bisphenol A dissolved. The resin was then cooled to 50° centigrade and drawn off. 65 parts of an organic polyisocyanate sold under the trademark "Mondur MR" was dissolved in 35 parts by weight of an ethyl benzene type solvent sold under the trademark "SC-150" by Buffalo Solvents and Chemicals. "Mondur Mr" has a functionality of 2.6 and the following generalized formula:

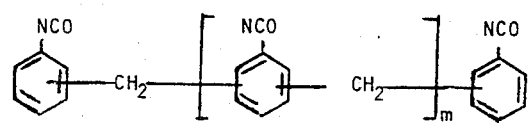

wherein $m$ has an average value of 0.6. A core mix was made by adding to a Hobart Mixer, 24 grams of the above resin solution, 24 grams of the above polyisocyanate solution and 7 pounds of lake sand (AFS-45). Mixing was continued for 4 minutes. The mix was then blown into an aluminum pattern with air at a pressure of 100 pounds per square inch to make 3 cores of a shape which may be described as a frustum of a cone having dimensions of ¾inch diameter at the top, 19/16 inch diameter at the bottom, and a height of 4¾ inches. The pattern was gassed for 30 seconds with triethylamine gas in an air carrier at 50 pounds per square inch air supplied pressure. The triethylamine catalyst container was pressurized with nitrogen at 80 pounds per square inch pressure. Triethylamine catalyst was injected in the air carrier stream at the rate of 10 cubin centimeters per minute. After gassing, the cores were purged with the air carrier stream for 30 seconds. This pattern was used to evaluate mold sticking or seizure. The cores made following the procedure of this Example showed inadequate mold release. A mold release agent sprayed on the aluminum pattern was necessary in order to provide adequate release of the core.

Standard 1 inch tensile specimens were prepared by blowing the mix into a two cavity pattern. Tensile strength at 15 minutes after gassing were 235 and 237 pounds per square inch. The air and nitrogen pressures used were the same as for preparing the frustums above. The specimens were gassed for 10 seconds and purged with air for 10 seconds.

EXAMPLE 15

Following the procedure of Example 14, a resin was made by mixing 25 parts by weight of an oxyalkylated novolac of Example 5, 35 parts of Bisphenol A (para,-para'-isopropylidene diphenol), 20 parts of an ethyl benzene type solvent sold under the trademark SC-100 by the Buffalo Solvents & Chemicals Co., and 20 parts of Cellosolve acetate (ethylene glycol monoethyl ether acetate). A sand mix was made following the procedure of Example 14 using 7 pounds of lake sand, 24 grams of the resin solution of this Example and 24 grams of the organic polyisocyanate solution of Example 14. The components were mixed for a period of 4 minutes. Thereafter, standard tensile specimens were made as in Example 14, but using a blowing pressure of 70 pounds per square inch. The specimens were gassed as in Example 14 for 10 seconds and purged with air for 10 seconds. The tensile specimens were made approximately 3 minutes after the completion of mixing and showed a tensile strength after aging 15 minutes subsequent to gassing of 205 and 185 pounds per square inch.

EXAMPLE 16

A resin was made by mixing 60 parts of the oxyalkylated novolac of Example 5 with 25 parts of Cellosolve acetate and 15 parts of an ethyl benzene type solvent sold under the trademark SC-100. The resin was used following the procedure of Example 15 to make standard tensile specimens which were gassed for 10 seconds and purged with air for 10 seconds. Specimens made 6 minutes after completion of mixing showed a tensile of 107 and 117 pounds per square inch. a second series of tensile specimens gassed 30 seconds and purged with air for 30 seconds made 12 minutes after mix completion showed a tensile strength of 137 and 127 pounds per square inch.

EXAMPLE 17

Following the procedure of Example 14, a sand mix was made up using a resin solution made by mixing 25 parts by weight of the oxyalkylated novolac of Example 5, 35 parts of Bisphenol A, 25 parts of Cellosolve acetate, and 15 parts of an ethyl benzene type solvent sold under the trademark SC-100. A sand mix was made following the procedure of Example 14 using 7 pounds of lake sand, 24 grams of the resin solution of this Example and 24 grams of the organic polyisocyanate resin solution of Example 14. Standard 1 inch tensile specimens were prepared following the procedure described in Example 14 but using 100 pounds per square inch blowing pressure. Tensile strength after 15 minutes aging following gassing was found to be 153 pounds per square inch and 155 pounds per square inch.

EXAMPLE 18

The procedure of Example 17 was followed using the same proportions of ingredients except that 6 ¼ percent of a polyethylene glycol ester of a fatty acid solid under the trademark "Kessco PEG 200 Monooleate" was added to the resin solution. Standard 1 inch tensile specimens prepared and tested as in Example 17 had a tensile strenth of 180, 197, 190 and 200.

EXAMPLE 19

Following the procedure of Example 17, except that 6 ¼ percent of methyl stearate was added to the resin solution prior to the preparation of the mixture with sand. Standard 1 inch tensile specimens were prepared as described in Example 17 which showed a tensile strength of 212 and 207 pounds per square inch.

EXAMPLE 20

The frustum mold described in Example 14 was used to mold samples of the binder sand compositions of Examples 17, 18 and 19. It was found that scratch hardness was 80 to 90 on all three of the cores produced using the above mixes. The release was very good to excellent with the cores made using the sand binder compositions of Example 18, good to very good with the sand binder compositions of Example 19, and poor to good with the sand binder composition of Example 17. The scratch hardness test was conducted as described in the *Foundry Sand Handbook*, 7th Ed., American Foundry Society Publication No. 12, using a Dietert No. 373 tester. A scratch hardness value of 75 is acceptable to the foundry industry.

EXAMPLE 21

Following the procedures described above, 5 percent of butyl stearate and alternately 5 percent of tall oil was added to the resin solution of Example 17 and tested in accordance with the procedure of Example 17. Results show an improvement in the tensile strength of the molded tensile specimens as compared to the tensile strength of the specimens of Example 17 in the case of the butyl stearate. Using tall oil results in a reduction in tensile strength. Evaluation of butyl stearate and tall oil additions as described above in the preparation of frustums indicates that tall oil is more efficient in reducing sticking and seizure than butyl stearate and that both are much improved over frustums made using no additive.

EXAMPLE 22

Following the procedure of Example 14, a resin solution was made up using the proportions of 25 parts by weight of the oxyalkylated novolac of Example 5, 35 parts by weight of Bisphenol A, 22.5 parts Cellolsolve acetate, and 17.5 parts of an ethyl benzene type solvent, sold under the trademark SC-100. To 100 parts of this resin solution was added 3 parts of a poly(ethylene glycol) ester of a fatty acid sold under the trademark "PEG 200 Monooleate" and the organic polyisocyanate of Example 14. Commercial evaluation in a foundry was made using a sand binder formulation of 100 parts of sand mixed with 12 fluid ounces each of the above described resin-phenolic compound solution and organic polyisocyanate solution. The gassing cycle used in the foundry is normally 30 seconds triethylamine gas and 30 seconds of air purge when using a binder sand composition of the prior art based upon a benzylic ether type phenol aldehyde resin combination with an organic polyisocyanate. It was found that satisfactory tensile strength could be maintained in comparison with the molds made using the sand binder composition of the prior art by cutting the triethylamine gassing time to 15 seconds and the air purge time to 15 seconds. A 10 pound core was made in the foundry using the sand binder composition described. Tensile strength on 1 inch standard tensile specimens, prepared in the foundry using the sand binder composition and a gassing cycle of 8 seconds gave a tensile strength of 184 pounds per square inch and a scratch hardness when measured as described above of 90 to 95.

EXAMPLE 23

Following the procedure of Example 14, a resin solution was made up using the proportions of 25 parts by weight of the oxyalkylated novolac of Example 5, 35 parts by weight of Bisphenol A, 22.5 parts of Cellosolve acetate and 17.5 parts of an ethyl benzene type solvent, sold under the trade name of SC-100. To 100 parts of this resin solution was added 5 parts of butyl stearate and 5 parts of tall oil. An organic polyisocyanate solution was made as in Example 14. To 100 parts of this solution was added 5 parts of butyl stearate.

Commercial evaluation in a foundry was made using a sand binder formulation of 100 parts of sand mixed with 10 fluid ounces each of the above described resin-phenolic compound solution and organic polyisocyanate solution. The gassing cycle used was 8 seconds triethyl amine gas and 8 seconds air purge.

Results show tensile strength of 1 inch standard tensile specimens of 165.8 and 149.5 pounds per square inch.

EXAMPLE 24

Control

A comparison was made with a commercially available benzylic ether type phenol-aldehyde-organic polyisocyanate system following the procedure of Example 23 using a sand binder formulation of 100 parts sand mixed with 12 fluid ounces each of benzylic ether resin solution and the organic polyisocyanate solution of Example 14.

Tensile strength of 1 inch standard tensile specimens prepared following the procedure of Example 23 were 157.8 pounds per square inch and 153.5 pounds per square inch.

While this invention has been described with reference to certain specific embodiments, it will be recognized by those skilled in the art that many variations are possible without departing from the scope and spirit of the invention.

What is claimed is:

1. A foundry aggregate composition comprising (1) a foundry aggregate; (2) an organic polyisocyanate; (3) a substantially nonaqueous, organic solvent soluble component having the formula:

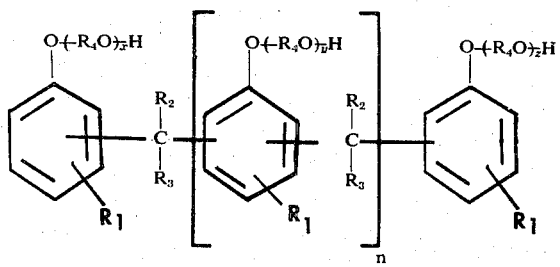

wherein
$n$ has an average value of about 0.2 to 6;
$x$, $y$ and $z$ are integers from 1 to 25;
$R_1$ is independently selected from the group consisting of hydrogen, fluorine, chlorine, bromine and hydrocarbon radical;
$R_2$ and $R_3$ are independently selected from the group consisting of hydrogen, an hydrocarbon radical; and a halogen-substituted hydrocarbon radical; and
$R_4$ is a hydrocarbon radical; and
(4) a phenolic compounds of the formula:

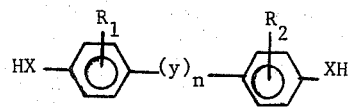

wherein X is oxygen or sulfur, Y is an alkylidene radical, an aryl bis-alkylene radical, an arylene radical, $-S-$, $-S-S-$, or

$n$ is 0 or 1, and $R_1$ and $R_2$ are hydrogen, alkyl of 1 to 6 carbon atoms or halogen.

2. The composition of claim 1 wherein components (2), (3) and (4) are in solution in an inert solvent.

3. A composition comprising the composition of claim 1 and a compound selected from the group consisting of poly(ethylene glycol) esters of fatty acids, and lower ($C_1$-$C_8$) alcohol esters of fatty acids.

4. The compositions of claim 2 wherein the solvent solution of components (2), (3) and (4) is present to the extent of about 0.8 to about 10% by weight based on the weight of said foundry aggregate.

5. A foundry aggregate composition comprising (1) a foundry aggregate, (2) a substantially non-aqueous organic solvent soluble component of the formula:

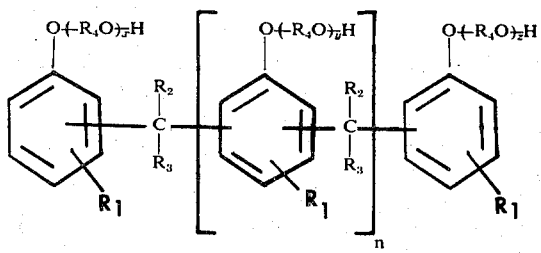

wherein
$n$ has an average value of about 0.2 to 6;

$x$, $y$ and $z$ are integers from 1 to 25;

R₁ is independently selected from the group consisting of hydrogen, fluorine, chlorine, bromine and hydrocarbon radical;

R₂ and R₃ are independently selected from the group consisting of hydrogen, a hydrocarbon radical, and a halogen-substituted hydrocarbon radical; and R₄ is a hydrocarbon radical, (3) a phenolic compounds of the formula:

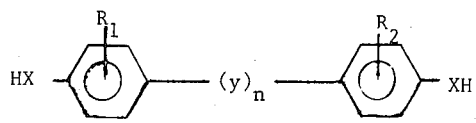

wherein X is oxygen or sulfur, y is an alkylidene radical, an aryl bis-aklylene radical, an arylene radical, —S—, —S—S—, or

$n$ is 0 or 1, and R₁ and R₂ are hydrogen, alkyl of 1 to 6 carbon atoms or halogen, and (4) an inert solvent.

6. The composition of claim 1 wherein said polyisocyanate is present in a proportion to provide from about 0.9 to 1.1 reactive isocyanato groups per reactive hydrogen present in components (3) and (4).

7. The composition of claim 1 wherein R₁, R₂ and R₃ are hydrogen.

8. The composition of claim 1 wherein the organic polyisocyanate is a polyaryl polyisocyanate.

9. The composition of claim 8 wherein said polyaryl polyisocyanate has a functionality of 2.6.

10. The composition of claim 7 wherein the solvent comprises ethyl benzene.

11. A composition which comprises the composition of claim 4 cured with a volatilized tertiary amine containing up to 20 carbon atoms.

12. The composition of claim 4 comprising (1) an organic polyisocyanate, (2) an inert solvent, and (3) a component selected from the group consisting of lower (C₁-C₈) alcohol esters of fatty acids.

13. The composition of claim 5 wherein the phenolic compound is a bisphenol.

14. The composition of claim 5 wherein said composition additionally comprises a component selected from the group consisting of poly(ethylene glycol) esters of fatty acids, and lower (C₁-C₈) alcohol esters of fatty acids.

15. The composition of claim 13 wherein the solvent comprises ethyl benzene and ethylene glycol monoethylether acetate.

16. The composition of claim 1, and a component selected from the group consisting of lower (C₁-C₈) alcohol esters of fatty acids, and poly(ethylene glycol) esters of fatty acids wherein said solution is present in the proportions of about 0.8 to about 10 percent by weight based upon the weight of said foundry aggregate.

17. A composition which comprises the composition of claim 16 cured with a volatilized tertiary amine containing up to 20 carbon atoms.

18. A process for bonding discrete inert, solid particles which comprises (1) coating said particles with a solution of a binder in an organic solvent comprising:

A. an organic polyisocyanate,

B. a substantially non-aqueous organic solvent soluble component having the formula:

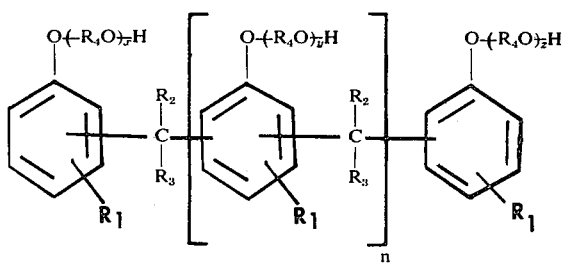

wherein $n$ has an average value of about 0.2 to 6;

$x$, $y$ and $z$ are integers from 1 to 25;

R₁ is independently selected from the group consisting of hydrogen, fluorine, chlorine, bromine, and hydrocarbon radical;

R₂ and R₃ are independently selected from the group consisting of hydrogen, a hydrocarbon radical, and a halogen-substituted hydrocarbon radical, and R₄ is a hydrocarbon radical; and (C) a phenolic compounds of the formula:

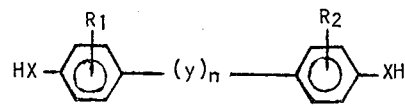

wherein X is oxygen or sulfur, y is an alkylidene radical, an aryl Bis-alkylene radical, an arylene radical, —S—, —S—S—, or

$n$ is 0 or 1, and R₁ and R₂ are hydrogen, alkyl of 1 to 6 carbon atoms or halogen; and (2) curing the resulting composition.

19. The process of claim 18 wherein said solution of a binder binder additionally comprises an easy release component selected from the group consisting of lower (C₁-C₈) alcohol esters of fatty acids, and poly(ethylene glycol) esters of fatty acids wherein said solution of a binder is present in the proportions of about 0.8 to about 10 percent by weight based on the weight of said foundry aggregate.

20. The process of claim 19 wherein the composition is cured by passing therethrough a volatilized tertiary amine containing up to 20 carbon atoms.

21. The process of claim 18 wherein the phenolic compound is a bisphenol.

22. The process of claim 20 wherein the phenolic compound is para,para'-isopropylidene diphenol and the composition is cured by passing a tertiary amine therethrough.

23. The process of claim 22 wherein the organic polyisocyanate is a polyaryl polyisocyanate and the solvent is a mixture comprising ethyl benzene and ethylene glycol monoethyl ether acetate.

24. The process of claim 22 wherein the tertiary amine is triethylamine.

25. The process of claim 23 wherein said polyaryl polyisocyanate has a functionality of 2.6

26. A binder composition for foundry aggregates comprising the the composition of claim 1 wherein the proportion of said (3) organic solvent soluble component to said (4) phenolic compound in said binder is from 30 percent to 100 percent.

27. A binder composition for foundry aggregates comprising the composition of claim 1 wherein the proportion of said (2) organic solvent soluble component to said (3) phenolic compound in said binder is from 30 percent to 100 percent, and wherein said (1) organic polyisocyanate is present in a proportion to provide from about 0.9 to 1:1 reactive isocyanate groups per reactive hydrogen present in components (2) and (3).

* * * * *

UNITED STATES PATENT OFFICE
CERTIFICATE OF CORRECTION

Patent No. 3,904,559              Dated September 9, 1975

Inventor(s) Ralph J. Furness et al.

It is certified that error appears in the above-identified patent and that said Letters Patent are hereby corrected as shown below:

At Column 1, lines 45-53, the formula should be as follows:

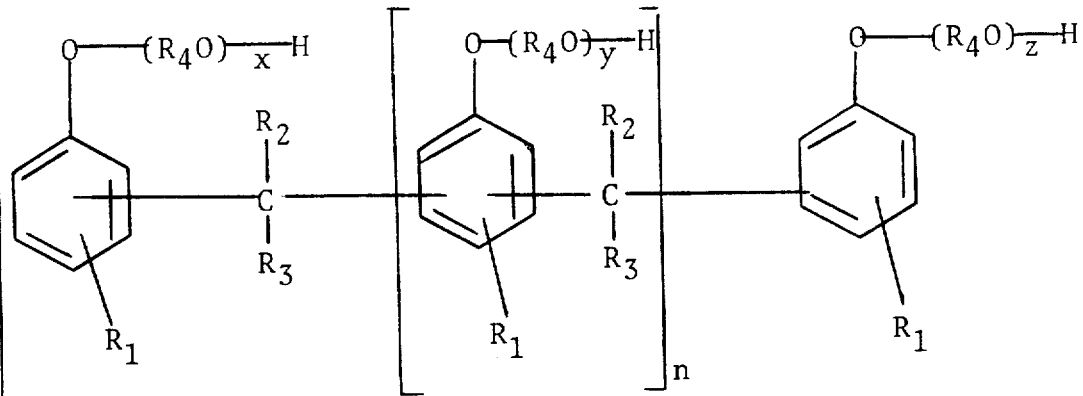

At Column 2, line 20 for "-S-" read "-S-, -S-S or $-\overset{\overset{O}{\|}}{S}-$".

At Column 2, lines 34 and 37, for "aggegate" read "aggregate".

At Column 6, line 48, for "F" read "concentrations".

At Column 11, line 45, for "repcetive" read "respective".

At Column 15, line 9, for "cubin" read "cubic".

At Column 16, line 15 for "solid" read "sold".

UNITED STATES PATENT OFFICE
CERTIFICATE OF CORRECTION

Patent No. 3,904,559           Dated September 9, 1975

Inventor(s) Ralph J. Furness et al.

It is certified that error appears in the above-identified patent and that said Letters Patent are hereby corrected as shown below:

At Column 18, line 25 for "compounds" read "compound".

At Column 19, Claim 5, line 9, for "compounds" read "compound".

At Column 19, line 17, for "bis-aklylene" read "bis-alkylene".

At Column 20, line 25, for "compounds" read "compound".

Signed and Sealed this

Twenty-second Day of May 1979

[SEAL]

Attest:

RUTH C. MASON
Attesting Officer

DONALD W. BANNER
Commissioner of Patents and Trademarks